Patented Aug. 20, 1946

2,406,039

UNITED STATES PATENT OFFICE 2,406,039

COATED METAL ARTICLE

Milton J. Roedel, Wilmington, Del., assignor to E. I. du Pont de Nemours & Company, Wilmington, Del., a corporation of Delaware No Drawing. Application December 4, 1942, Serial No. 467,908

4 Claims. (Cl. 117—132)

This invention relates to coated metal articles and more particularly to metal food containers provided with an interior protective coating.

At the present time wet pack metal containers for foodstuffs and beverages are commercially manufactured from tin plate. Due to the expense and the dependence on foreign sources of supply of tin, a satisfactory substitute for tin plate is desirable.

Protective coatings for wet pack containers generally consist of resins and/or drying oils with or without the addition of other materials, applied over the tin coating of the metal container. These coatings aid in preventing the beverage or foodstuffs from staining the bright tin surface and in preventing the tin from reducing the coloring matter of the foodstuffs, but they are not satisfactory practically as tin substitutes over black sheet steel because of poor adhesion and poor impermeability and flexibility characteristics.

The requirements are very stringent for a protective coating for black sheet steel for wet pack containers; the coating must possess excellent adhesion after the container contents are processed at elevated temperatures, e. g., 2 hours at 121° C. in the presence of water and foodstuff; the coating must be impermeable since steel reacts readily with water and the acid foodstuffs; the coating must have a high softening point or otherwise it will soften during processing operations and become permeable; the coating must be scratch-resistant in order to withstand the hard usage it receives during the can manufacturing steps; and the coating must be flexible enough to withstand can-forming operations. Other properties which are desirable include resistance to essential oils, odorlessness, tastelessness, and a pleasing appearance.

The normally solid polymers of ethylene, more particularly described hereinafter, have several properties which make them particularly valuable in can manufacture. For example, these polymers are highly inert and due to their cold drawing properties and flexibility, the polymer coated metal is capable of withstanding the can-forming operations of crimping, bending, and deep die-drawing. The polymer coating, however, presents the possibility of improvement in other important respects. Thus, when a polymer of ethylene is applied to black sheet steel at normal baking temperatures, which are below 200° C. for 10 to 15 minutes, the coatings do not have, after processing at 121° C., as high a scratch-resistance and adhesion to the metal as is desirable, and because of their low softening point (105°–110° C.) the coatings tend to become permeable at the mentioned processing temperature.

The above mentioned polymers which are used in the practice of this invention and referred to herein as polymers of ethylene are the solid polymers obtained by known procedures through the polymerization with heat and pressure of ethylene alone or of mixtures consisting of ethylene and another compound containing at least one polymer forming unsaturated linkage. These polymers can be obtained, for example, by heating ethylene or the mentioned mixture thereof under a pressure above 500 atmospheres and preferably above 1000 atmospheres at temperatures of from 100° to 400° C., and preferably from 150° to 250° C. as described in United States Patents 2,153,553, 2,188,465, and 2,200,429. Another method of making these ethylene polymers consists in heating the ethylene alone or in admixture with another polymerizable compound in contact with water and a per-compound catalyst at temperatures in the range of 40° to 350° C. and at superatmospheric pressures in excess of 3 atmospheres. The polymers of ethylene alone are normally solid, correspond in composition substantially to $(CH_2)_x$, and show a crystalline pattern by X-ray diffraction analysis. The physical properties of the polymers of ethylene with other polymerizable organic compounds vary depending upon the composition of the polymer and the nature of the organic compound polymerized with the ethylene.

This invention has as an object the production of new and improved ethylene polymer coated metal articles. A further object is the manufacture of improved coated metal food and beverage containers. A further object is the production of wet pack food containers having an interior protective coating which, after the container contents have been processed at 121° C., have a high scratch-resistance and high adhesion and are highly impermeable. A still further object resides in a novel process for obtaining these products. Other objects will appear hereinafter.

The above objects are accomplished by applying a film of the ethylene polymer of less than one mil in thickness to and in contact with the metal surface to be covered and baking the composite at a temperature above 200° C. in contact with air, and continuing the heating until the film becomes insoluble in a solvent for the untreated polymer. The baking schedule, which is more drastic than that normally used from the standpoint of the combined factors of temperature and time, is dependent upon the temperature, the type of surface coated, the specific polymer used, the film thickness, and the type of coating desired. It will be understood that the mention of air refers also to any oxygen containing gas.

I have discovered that when the ethylene polymer is heated in thin films under the above conditions that an insolubilization, hardness and impermeability is obtained which is not obtained by heating the polymer in the massive state or in thicker films. The thermosetting properties in the ethylene polymer by the present process cannot be explained with certainty, but it is apparently due to reaction brought about by the fact that oxygen can penetrate the thin film to the metal surface where metallic oxides or activated oxygen are formed and catalyze the hardening process.

Although improved products can be obtained in the case of various metals, e. g., copper, aluminum, tin plate, zinc, brass and other metals, as the substrate, the invention is most advantageously practiced by applying the polymer film over iron, namely, sheet iron or sheet steel, since the above mentioned catalytic effect is greater and since the use of the more expensive and less available metals is avoided. When the colorless coatings of ethylene polymer are applied on black sheet steel and are baked at schedules above normal (i. e., to 5 minutes at 250° C. or up to 30 minutes as the temperature approaches 200° C.) they turn golden yellow in color and possess an excellent scratch-resistance, excellent adhesion after processing at 121° C., and their softening point is well above 121° C. Furthermore, these coatings are no longer soluble or even swollen by the hot solvents from which they are applied, which demonstrates the surprising fact that these polymeric hydrocarbons possess the ability to thermoset at high baking schedules, instead of decomposing as would normally be expected judging by behavior or massive sections of the polymers on heating.

The invention is further illustrated by the following examples in which the parts are by weight.

Example I

A sheet of 85 lb. cold reduced black steel is pickled in dilute sulfuric acid and washed free of acid with water and dried. Ten parts of ethylene polymer of average molecular weight about 10,000 is dissolved in 90 parts of hot xylene and applied by dipping in such a manner that a coating weight approximately 30 mg./4 in. sq. is obtained. The coated sheet is then baked 4.5 minutes at 250° C. The coating obtained is very adherent, even after prolonged soaking in water. Its excellent flexibility is attested by the fact that on fabrication of a can lid no film failure is apparent, even after immersion in copper sulfate solution or after heating in tomato juice 2 hours at 15 lbs. steam pressure. The coating's excellent impermeability characteristics are also evident on heating a can lid in lima beans, in which case no sulfide staining occurs. The coating also possesses an attractive golden yellow color, is scratch-resistant and is no longer soluble in boiling xylene. When placed on an outdoor exposure rack with a dipped tin plate control, the coating is equivalent to the tin coating in lack of underfilm corrosion and is markedly superior in nonrusting properties.

Example II

Ten parts of ethylene polymer of average molecular weight about 25,000 is dissolved in 90 parts of hot xylene and the solution stirred vigorously with gradual cooling to room temperature. The ethylene polymer dispersion formed in the above manner is roller-coated onto a sheet of 107 lb. tin plate at a coating weight of around 20 mg./4 in. sq. and baked 8 minutes at 250° C. A yellow brown, adherent, flexible, inert, tasteless, insoluble coating is produced. The coated sheet can be formed into a food or beer can in the usual manner.

Example III

A sheet of phosphatized black steel known by the trade name Bonderite K is coated with a polymer of ethylene with vinyl acetate containing a mol ratio of ethylene/vinyl acetate of 8:1, at a coating weight of around 20 mg./4 in. sq. and baked 10 minutes at 250° C. A yellow brown, flexible, adherent, scratch-resistant, inert, insoluble coating is obtained. The coated sheet can be formed into a food or beverage container in the usual manner.

Example IV

An xylene dispersion, prepared as in Example II, of an ethylene polymer having an average molecular weight of about 10,000 is sprayed onto a sheet of aluminum at a coating weight of 20 mg./4 in. sq. and baked 10 minutes at 250° C. The coating obtained is flexible, adherent, scratch-resistant, inert and insoluble.

Example V

No. 18 copper wire is passed through molten ethylene polymer having an average molecular weight of about 10,000, the excess removed with a die and the wire baked 10 minutes at 260° C. The coating obtained is very adherent, flexible, resistant to water and oils, and possesses excellent electrical properties.

Solvents useful for the application of the initial polymer of ethylene include xylene, toluene, trichloroethylene, and tetrachloroethylene. Since the polymer is not significantly soluble in the solvents below about 70° C., it is desirable to apply the solution to metal heated to a temperature somewhere above 70° C.

As previously indicated, the term "polymer of ethylene" is used herein to refer to the products obtained by polymerizing ethylene alone or in admixture with another compound containing a polymer forming unsaturated linkage, such as, for example, carbon monoxide, formaldehyde, vinyl ethers, ketones or esters or other vinyl compounds, e. g., methyl vinyl ether, methyl and ethyl vinyl ketones, vinyl acetate, vinyl chloride, vinyl chloroacetate, dimethyl 1-propene-2-phosphonate, N-vinyl phthalimide, vinyl thiolacetate, etc.; stilbene, propylene, butylene, etc.; acrylic and methacrylic acids and their derivatives such as, for example, the esters, amides, and imides; maleic acid and its esters, and itaconic acid and its esters.

Hydrolysis products such as hydrolyzed ethylene/vinyl acetate polymers can also be used in the practice of this invention as may also mixtures of the above polymers of ethylene or mixtures of polymers of ethylene with other agents such as waxes, high boiling organic liquids and natural and synthetic polymeric materials.

The application of the polymer film to the metal can be accomplished by any of the known methods such as dipping, roller-coating, solution spraying, melt spraying with a torch gun, brush coating, etc. The polymer can also be applied as an organic frit or as a preformed sheet prior to the baking treatment. Where necessary, the article to be coated can be cleaned by degreasing, pickling, abrading or by other methods known to the art.

The time of baking is dependent upon the temperature, the type of metal coated, the specific polymer used, and type of coating desired. For 0.5 mil thick films of ethylene polymer of average molecular weight of 15,000 on deoxidized black sheet steel the following baking times appear to be equivalent: 4.5 minutes at 250° C.; 12 minutes at 225° C.; and 30 minutes at 210° C. For 0.5 mil thick films of ethylene polymer the following times of bake at 250° C. are just sufficient to give insoluble coatings on the following metal surfaces: 4.5 minutes on black sheet steel; 8 minutes on tin plate; 10 minutes on nickel, aluminum, copper and phosphatized black steel known commercially as Bonderite K. With regard to the specific polymer used, polymers of ethylene yield insoluble coatings on black sheet steel in 4.5 minutes at 250° C. whereas a 42:1 (mol ratio) ethylene/dimethyl 1-propene-2-phosphonate at the same film thickness requires 10 minutes at 250° C. The time of baking at a given temperature will also depend upon the properties desired. As the time of baking is prolonged the coating becomes harder and more impermeable, but the flexibility decreases. It is possible to obtain satisfactory conversions of the ethylene polymer to the insoluble stage by "flash" baking the coating, i. e., by exposing the coating to a very high temperature for a short time. If a rigid preformed article is coated, a longer baking time would be advisable than that which would be given to a sheet of metal which is to be fabricated into a container.

It is also possible to obtain insoluble, hard, protective ethylene polymer coatings at lower baking temperatures by adding to the ethylene polymer coating composition a small percentage of a metallic salt such as ferric linoleate, cobalt naphthenate, lead resinate, manganese resinate, etc. Ferric linoleate is particularly effective in promoting the hardening of ethylene polymer coatings.

This invention makes possible the production of improved coated articles of enhanced utility by reason of the adherence, high scratch-resistance, insolubility, flexibility, impermeability and high softening point of the coating. The invention, as previously indicated, is particularly valuable for obtaining insoluble, adherent, flexible, hard, inert protective coatings for wet and dry pack metal containers, kegs; drums and cans, and for such uses as a wire enamel for electrical insulation, and for protective purposes.

As many apparently widely different embodiments of this invention may be made without departing from the spirit and scope thereof, it is to be understood that I do not limit myself to the specific embodiments thereof except as defined in the appended claims.

I claim:
1. A process for obtaining a metal article having a hard, adherent coating which comprises applying to the metal surface a film, not exceeding one mil in thickness, of a polymer of ethylene, and baking the coated metal at a temperature above 200° C. in contact with an oxygen containing gas until the film becomes insoluble in solvent for the untreated polymer.

2. A metal article having an adherent coating consisting of a baked, thin film not exceeding one mil in thickness of a polymer of ethylene, said baked film melting above 120° C. and being insoluble in xylene, said article being that obtained by applying to the metal a film of a polymer of ethylene of said thickness and baking the coated metal at a temperature above 200° C. in contact with an oxygen-containing gas until the film becomes insoluble in xylene.

3. A metal container having on its surface a thin, adherent, scratch-resistant, impermeable and insoluble coating consisting of a baked, thin film not exceeding one mil in thickness of a polymer of ethylene, said baked film melting above 120° C. and being insoluble in xylene, said metal container being that obtained by applying to the metal forming the inner surface of the container a film of a polymer of ethylene of said thickness, and baking the coated metal at a temperature above 200° C. in contact with an oxygen-containing gas until the film becomes insoluble in xylene.

4. A metal container composed of iron-containing sheet metal having on its inner surface an adherent thin scratch-resistant, impermeable and insoluble coating consisting of a baked, thin film not exceeding one mil in thickness of a polymer of ethylene, said baked film melting above 120° C. and being insoluble in boiling xylene, said metal container being that obtained by applying to the metal forming the inner surface of the container a film of a polymer of ethylene of said thickness, and baking the coated metal at a temperature above 200° C. in contact with an oxygen-containing gas until the film becomes insoluble in xylene.

MILTON J. ROEDEL.